(12) United States Patent
Ryser

(10) Patent No.: US 9,072,402 B2
(45) Date of Patent: Jul. 7, 2015

(54) CAPSULE WITH RELIEF-SHAPED SEALING MEMBER

(75) Inventor: Antoine Ryser, Lausanne (CH)

(73) Assignee: Nestec S.A., Vevey (CH)

( * ) Notice: Subject to any disclaimer, the term of this patent is extended or adjusted under 35 U.S.C. 154(b) by 590 days.

(21) Appl. No.: 12/850,822

(22) Filed: Aug. 5, 2010

(65) Prior Publication Data

US 2011/0185910 A1     Aug. 4, 2011

(30) Foreign Application Priority Data

Aug. 5, 2009  (EP) ..................................... 09010132

(51) Int. Cl.
*A47J 36/00* (2006.01)
*A47J 31/06* (2006.01)
*A47J 31/36* (2006.01)
*B65D 85/804* (2006.01)

(52) U.S. Cl.
CPC ............ *A47J 31/0684* (2013.01); *A47J 31/369* (2013.01); *B65D 85/8043* (2013.01)

(58) Field of Classification Search
USPC ......... 99/279, 287, 295, 300, 302 C, 302 FB, 99/302 R, 305, 307, 323; 426/77, 78, 79, 426/112, 115, 432, 433; 206/0.5, 219
See application file for complete search history.

(56) References Cited

U.S. PATENT DOCUMENTS

| | | | | |
|---|---|---|---|---|
| 3,334,774 A | * | 8/1967 | Poltorak | ........................ 220/378 |
| 4,077,656 A | * | 3/1978 | Swindler | ........................ 285/110 |
| 4,758,004 A | * | 7/1988 | Semon | ........................... 277/648 |
| 4,775,048 A | * | 10/1988 | Baecchi et al. | ................. 206/0.5 |
| 5,402,707 A | | 4/1995 | Fond et al. | |
| 2007/0181003 A1 | | 8/2007 | Bardazzi | |
| 2007/0224319 A1 | * | 9/2007 | Yoakim et al. | ................. 426/433 |
| 2009/0320692 A1 | * | 12/2009 | Simanski | ......................... 99/279 |
| 2010/0186599 A1 | * | 7/2010 | Yoakim et al. | ................... 99/295 |
| 2011/0297005 A1 | | 12/2011 | Mariller | |
| 2012/0210878 A1 | | 8/2012 | Mariller | |
| 2012/0225168 A1 | | 9/2012 | Kamerbeek et al. | |
| 2012/0231123 A1 | | 9/2012 | Kamerbeek et al. | |
| 2012/0231124 A1 | | 9/2012 | Kamerbeek et al. | |
| 2012/0251694 A1 | | 10/2012 | Kamerbeek et al. | |

FOREIGN PATENT DOCUMENTS

| | | | |
|---|---|---|---|
| CH | 605293 | 9/1978 | |
| EP | 512470 | 11/1992 | |
| EP | 1273528 | 1/2003 | |
| EP | 1344724 | 9/2003 | |
| EP | 1654966 | 5/2006 | |
| EP | 1654966 A1 * | 5/2006 | ........... B65D 85/804 |

(Continued)

OTHER PUBLICATIONS

European Search Report—Application No. / Patent No. 09010132. 0-2308 dated Dec. 23, 2009, 6 pages.

(Continued)

*Primary Examiner* — Thien S Tran
(74) *Attorney, Agent, or Firm* — K&L Gates LLP

(57) ABSTRACT

The present invention proposes a capsule for containing beverage ingredients, the capsule being designed for insertion in a beverage production device, the capsule comprising a cup-like body portion, a flange-like rim portion, a delivery wall and a sealing member having—in a radial cross sectional view—at least one protrusion and/or recession.

19 Claims, 3 Drawing Sheets

(56) References Cited

FOREIGN PATENT DOCUMENTS

| | | |
|---|---|---|
| EP | 1839543 | 3/2007 |
| EP | 1 849 715 | 10/2007 |
| EP | 2 070 828 | 6/2009 |
| EP | 09163310.7 | 6/2009 |
| EP | 09010132.0 | 8/2009 |
| EP | 2284101 | 2/2011 |
| EP | 2289820 | 3/2011 |
| FR | 2617389 | 1/1989 |
| WO | 9742739 | 11/1997 |
| WO | 2006045537 | 5/2006 |
| WO | WO2006137737 | 12/2006 |
| WO | 2007 137974 | 12/2007 |
| WO | WO 2007137974 A2 * | 12/2007 ........... B65D 85/804 |
| WO | WO2008037642 | 4/2008 |
| WO | WO2008148646 * | 12/2008 ............. A47J 31/06 |
| WO | 2009090201 | 7/2009 |
| WO | WO2009115474 | 9/2009 |
| WO | 2010128844 | 11/2010 |
| WO | 2010137949 | 12/2010 |
| WO | 2010137954 | 12/2010 |

OTHER PUBLICATIONS

H. Keller, et al., "Kaffee und Tee aus der Kapsel—frisch und perfeckt inn Geschmack," Angst + Pfister Magazine article, Nov. 2006, No. 2, 3 pages.

\* cited by examiner

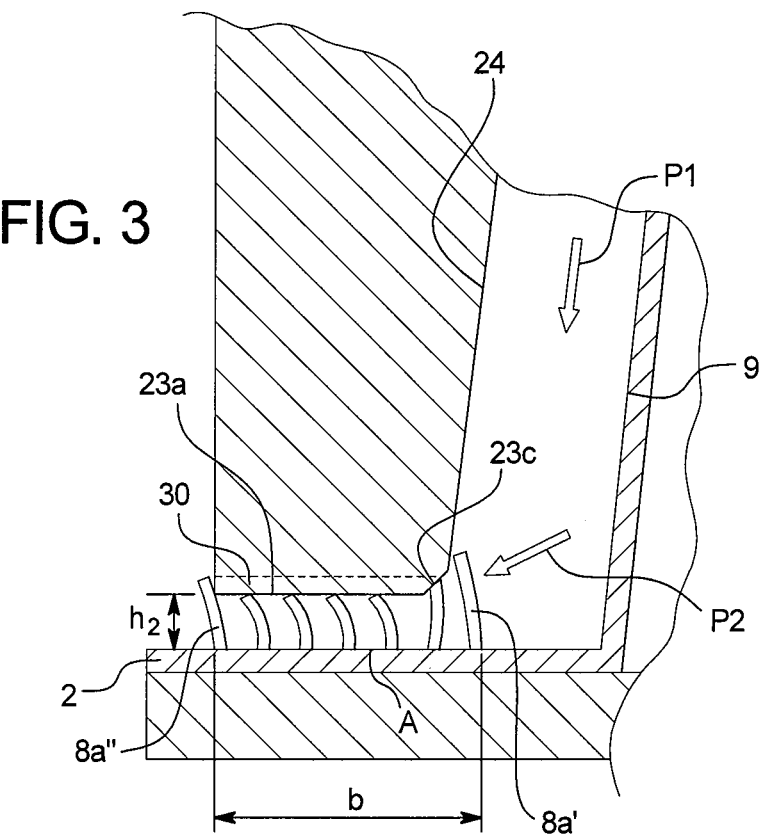
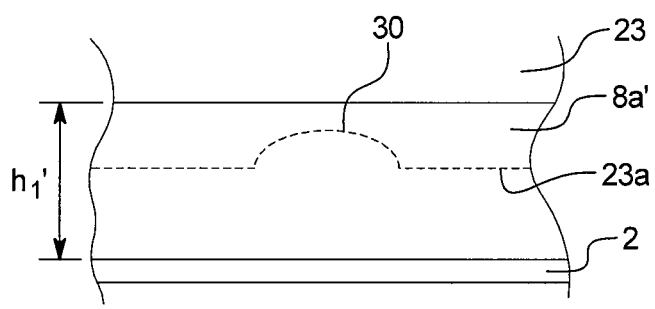

CAPSULE WITH RELIEF-SHAPED SEALING MEMBER

FIELD OF THE INVENTION

The present invention generally relates to the field of capsules for accommodating portioned beverage ingredients. More particularly, the invention relates to a capsule having a relief-shaped sealing member.

BACKGROUND

Devices for preparing a beverage by injecting pressurized fluid into a capsule are well-known, especially in the field of producing coffee or coffee type beverages. In addition, other comestible ingredients such as chocolate or milk products can be contained within the capsule. By means of an interaction of these ingredients with a liquid, a beverage such as coffee, tea or other comestibles, such as for example soup, can be produced. The interaction can be for example an extraction, brewing, dissolution, etc. process. Such a capsule is particularly adapted to contain ground coffee in order to produce a coffee beverage by having hot water under pressure enter the capsule and draining a coffee beverage from the capsule.

Systems and methods for obtaining fluid comestibles from substances containing capsules are for example known from EP-A-512470 (counterpart of U.S. Pat. No. 5,402,707).

A capsule filled with beverage ingredients is inserted in a dedicated chamber of the system in which water injection means are provided which enable to inject water into the capsule. In the chamber, dedicated opening means are provided which generate at least one opening in a first wall of the capsule. Accordingly, water entering the capsule through the opening in a first wall is made to interact with ingredients contained in the capsule while traversing the interior of the capsule and is then made to leave the capsule through at least one opening/perforation provided in a second wall of the capsule. As a result of the interaction between water and the ingredients in the capsule, a beverage or other comestible can be produced.

It has been found that during a lifecycle of a beverage preparation device to be used in conjunction with such a capsule, irregularities such as a slightly different closing force due to bearing play or even small ridges or grooves in a dedicated enclosing member of such a device are likely to be present respectively to occur. Moreover, irregularities may also be provided on purpose for facilitating removal of the capsule from the beverage producing device and/or improving the force distribution on the capsule and reducing the force required for closing the device onto the capsule. Hence, small 'leaks' may be present during the enclosure of a capsule in a dedicated beverage producing device. Thereby, any 'leak' at the exterior of the capsule reduces the pressure build-up inside the capsule. On the other hand, it is well known that a sufficient extraction pressure is a key factor for the quality of espresso-style coffee.

Accordingly, different pressure drops within the capsule may occur if used in conjunction with different beverage producing devices. This however might not be easily anticipated by the user and it however will negatively affect the sealing properties of the dedicated enclosing members of a beverage preparation device.

Therefore, the present invention aims at providing enhanced sealing properties for such a capsule in order to compensate for different kinds of pressure drops within the capsule and thus, enable effective sealing of the capsule during beverage preparation.

In particular, the solution of the invention provides a proper sealing compensation to take into account the irregularities and/or adapt to different designs of devices.

SUMMARY

According to a first aspect of the present invention a capsule for containing beverage (or other liquid comestibles) ingredients is proposed. The capsule is designed for insertion in a beverage production device in a liquid under pressure enter the capsule and to interact with the ingredients in the capsule. According to the invention the capsule comprises a cup-like body portion, a flange-like rim portion, a delivery wall and a sealing member having—in a radial cross sectional view at least one protrusion and/or recession.

According to a mode of the invention, the at least one protrusion extends from a relatively flat portion of the flange-like rim portion, along a height that is larger than the average width of the protrusion. The protrusion has a height that is at least 1.5 time, preferably at least 2 times, even most preferably at least 3 times, larger than its average width.

The sealing member of the capsule is deformed when the capsule is put in sealing engagement with an enclosing member of a dedicated beverage production device. Thereby, deformation of the protrusion and/or recession of the sealing member leads to an initial biasing of the sealing member against the enclosing member and thus, effective sealing is obtained.

In a preferred embodiment, the at least one protrusion and/or recession form a relief-shaped sealing member which is designed for compensating eventual irregularities in a matching sealing surface of a beverage production device cooperating with the sealing member of the capsule.

Hence, irregularities such as e.g. grooves, gaps or fractures (whether obtained by design or due to wearing) can be effectively sealed due to the sealing member. Hence, the capsule can be adapted to be used with a large variety of different beverage preparation devices. Moreover, even in case of wear and tear effects such as an increased bearing play, the capsule according to the present invention enables effective sealing. Accordingly, the capsule can be use with a large variety of different beverage preparation devices without leaking.

The at least one protrusion is intended to be compressed by the enclosing member during said engagement. Therefore, the at least one protrusion is preferably oriented perpendicular or slightly inclined (i.e., at an angle preferably lower than 45 degrees) relative to the flange-like rim portion.

Thereby, due to the relief-shaped embodiment of the sealing member, effective sealing can be obtained without the need of providing a large volume sealing member which enables sealing only by simply compressing a large volume between two portions to be sealed. Hence, effective sealing is obtainable while at the same time, the measures and/or the weight of the sealing member can be minimized.

The sealing member can be made integral to the capsule or be associated as a separate piece to the capsule. In the latter case the sealing member can be removable or, alternatively, can be fixedly connected to the capsule's body or rim portion. Thereby, the sealing member can be attached to the rim portion of the capsule using an adhesive or by a welding technique such as for example thermal or ultrasonic welding. In another possible embodiment, the sealing member may be pinched by the capsule material.

The sealing member is preferably made from e.g. plastic(s), rubber or silicone.

The sealing member is preferably resilient due to its shape and/or the material used. However, the sealing member may as well be of rigid material. Thereby, the sealing member may for example be of a constituent material of the capsule body and/or rim portion.

In a preferred embodiment, the sealing member is designed to be compressed from a first height to a second height. Hence, sealing engagement is obtained by the matching surface of the beverage production device exerting a positive pressure force on the sealing member, from a first uncompressed thickness of the sealing member to a second compressed thickness thereof. Moreover, the sealing member is preferably bendable so that it can exert a biasing force against the matching pressing surface of the beverage production device.

In a preferred embodiment, the sealing member comprises at least two lips distanced radially to one another. Preferably, the sealing member is formed of a multitude of concentrically arranged lips. Thereby, the rigidity of the lips preferably differs from the capsule's body and/or rim portion. In particular, the lips preferably constitute a resilient portion which is designed for compensating eventual irregularities in a matching sealing surface of a beverage production device.

In a preferred embodiment, the lips are protruding from the rim portion of the capsule parallel to a centre axis of the capsule body portion to a predefined height (h). Thereby, height (h) is preferably the same for each of the protruding lips.

Alternatively, height (h) may as well vary for each of the lips. Accordingly, the geometric form of the relief-shaped sealing member can be of various designs in order to enhance the sealing properties of the sealing member.

In a preferred embodiment, the lips are arranged at the flange-like rim portion in a predefined circumferential sealing area which is designed to interact with the matching sealing surface of a beverage production device. Thereby, the sealing area is positioned radially outside of the outer periphery of the cup-like body portion of the capsule.

Preferably, the sealing area is designed to be broader than the matching sealing surface of a beverage production device. Accordingly, at least an outer and/or inner circular portion of the sealing member is not compressed by a matching sealing surface of the beverage production device when enclosing the capsule. The inner and/or outer circular portion of the sealing member which is not compressed comprises at least one sealing lip.

In a preferred embodiment, at least one sealing lip is designed to be positioned upstream of a sealing engagement between the capsule and a matching sealing surface of an enclosing member of a beverage production device. Accordingly, said at least one sealing lip may be deformed to contribute to the sealing of the capsule when placed in sealing engagement with a dedicated enclosing member. In particular, said at least one sealing lip may be designed to be deflected against an inner side wall of the enclosing member to overlap with provided irregularities within the matching sealing surface and thus, to enhance the sealing properties of the capsule.

Distance (d2) between two neighboring lips is preferably smaller than smallest height (h) of the respective lips. Accordingly, effective sealing is obtained by exerting a bending and/or compressing force onto the lips which are thus deflected to seal the space(s) between neighboring lips. Hence, sealing of the rim portion of the capsule when placed in a sealing engagement with a matching sealing surface of a dedicated beverage production device is obtained.

Moreover, distance (d2) can be equal between two adjacent lips. Alternatively, distance (d2), as well as thickness (t) and height (h) of the lips, may be varied in order to further adjust the sealing properties of the sealing member.

For example, distance (d2) between two neighboring lips 8a may be arranged to decrease from the body portion 1 towards the outer rim portion of the capsule.

Hence, each lip seals the area between the rim portion and the matching sealing surface of a beverage production device and thus, creates a pressure drop. Thereby, as a plurality of lips is arranged in series, the addition of the pressure drops enables a fluid-tight seal of the capsule when being enclosed by a dedicated enclosing member of a beverage production device.

The body and rim portion of the capsule according to the present invention are preferably made of plastics or a metal such as e.g. aluminum.

The capsule comprises a delivery wall formed of a gas impermeable membrane connected to the body for sealing an ingredients compartment of the capsule.

In a possible alternative, the delivery wall is formed of a liquid permeable wall such as a filter.

In another aspect, the present invention relates to a beverage production system comprising a capsule according to the invention, and a beverage production device designed for accommodating the capsule in a brewing chamber, wherein the brewing chamber is defined at least partially by a capsule enclosing member having a front surface with irregularities, such as grooves, the front face of the enclosing member cooperating with the sealing member of the capsule.

Thereby, said irregularities in a matching sealing surface of a beverage production device are preferably radially oriented grooves.

The described capsule enables an effective interaction with a dedicated beverage production device which is designed to provide a heated and pressurized liquid to the interior of the capsule. According to the invention, a beverage can be prepared by a beverage production device without any leakage of the capsule.

Further features, advantages and objects of the present invention will become apparent for the skilled person when reading the following detailed description of embodiments of the present invention, when taken in conjunction with the figures of the enclosed drawings.

Additional features and advantages are described herein, and will be apparent from the following Detailed Description and the figures.

BRIEF DESCRIPTION OF THE FIGURES

FIG. 3 shows a capsule according to the present invention engaged by a dedicated enclosing member of a beverage production device.

FIG. 4 shows a cross-sectional side view perpendicular to the radial grooves of the enclosing member of the beverage production device.

DETAILED DESCRIPTION

Figure 1A:
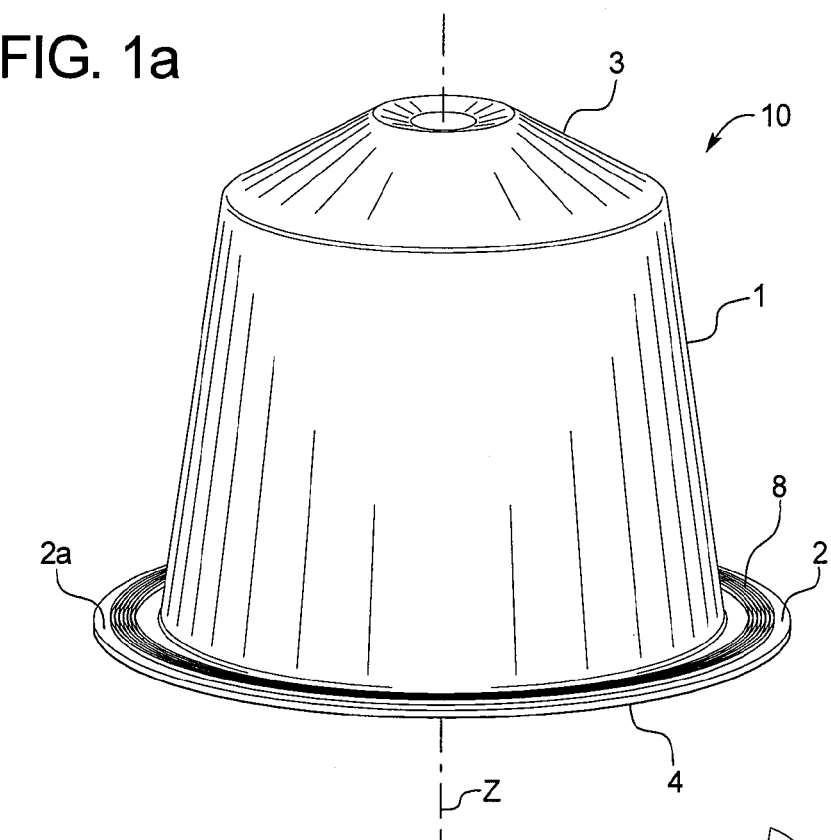
FIG. 1a shows a capsule according to the present invention in perspective side view.

FIG. 1a shows the capsule according to the present invention in perspective side view. The capsule 10 as shown in FIG. 1 has a preferably cup-like respectively frustoconical body portion 1 which comprises an aperture 4 provided at an outlet face of the capsule, opposite to the inlet face 3 thereof. Thus, the body portion 1 forms an ingredients compartment 5 (see FIG. 2) which is filled with ingredients such as ground coffee or tea. The capsule further comprises a rim portion 2 circumferentially arranged to the aperture 4 of the body portion 1.

For enclosing of the ingredients provided to the ingredients compartment 5, a membrane 6 (see FIG. 2) is provided. The membrane 6 is preferably a foil member and is sealed to the flange-like rim portion 2 of the capsule 10 to hermetically close-off the body portion 1.

The capsule's body and rim portion 1,2 preferably form a single member which can be obtained by plastic injection moulding or a deep drawing process. It should be noted that other designs for the capsule are possible as long as the capsule can be sealed and contain the mentioned ingredients.

The capsule further comprises a sealing member 8 which is arranged at the rim portion 2 of the capsule. The sealing member 8 can be integrally formed with the capsule 10 or formed as a separate piece. In the latter case the sealing member may be mounted releasably to the rim portion 2 or fixed thereto e.g. by a welding technique or by means of an adhesive.

The sealing member 8 according to the present invention comprises at least one protrusion and/or recession in a radial cross sectional view of the capsule. Thereby, the sealing member 8 can be resilient due to the material used and/or due to the geometrical shape of the sealing member 8.

Preferably, the sealing member 8 can be made from rubber-elastic material. The term 'rubber-elastic' means any suitable material having rubber elasticity including but not limited to elastomers, silicones, plastics, latex, balata or others. However, the sealing member 8 does not necessarily have to be elastic in order to enable a sealing of the capsule during beverage preparation.

In an alternative, the sealing member can be plastically deformable.

Figure 1B:
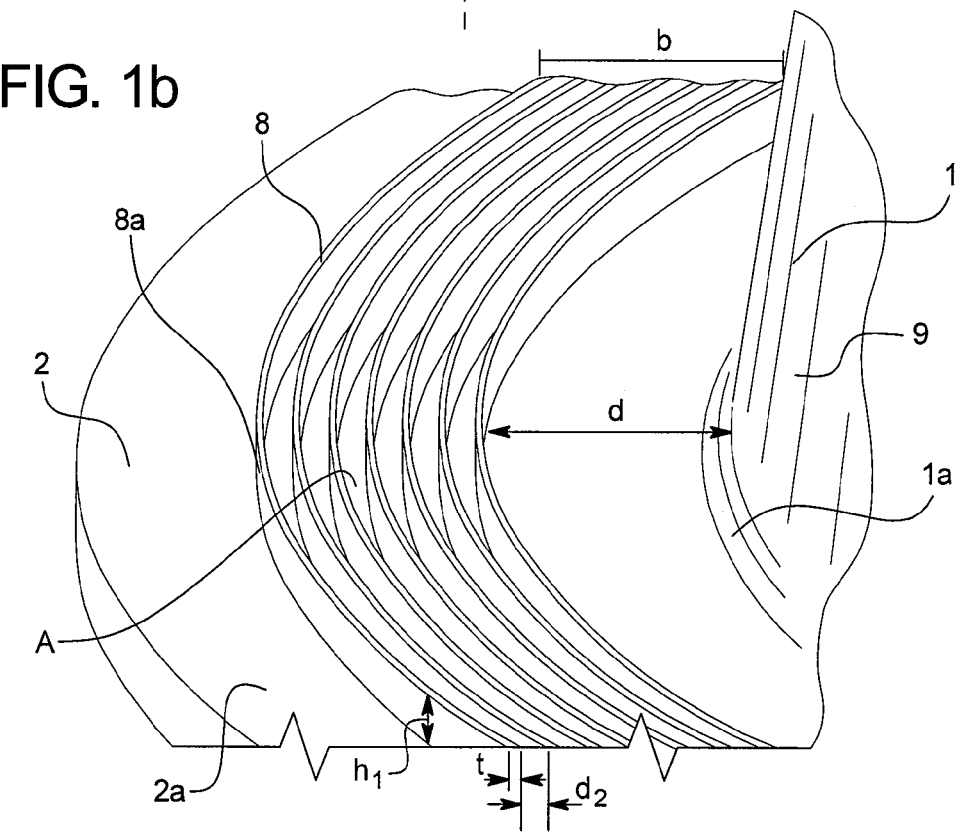
FIG. 1b shows a perspective side view of a sealing member arranged on the rim portion of the capsule.

As shown in FIG. 1b, the sealing member 8 preferably comprises concentrically arranged lips 8a. Thereby, the lips 8a are protruding from the rim portion 2 of the capsule 10 preferably in a direction parallel to rotational axis Z of capsule 10 (see FIG. 1a). However, the lips 8a may as well be inclined towards the capsule body portion 1 or inclined away therefrom. Moreover, different lips 8a may be inclined about different angles with respect to axis Z (see FIG. 1a) of the capsule.

The lips 8a are preferable arranged at a sealing area A which is circumferentially arranged to the sidewall 9 of the capsule body portion at a distance d. Accordingly, a clearance d is provided between the sealing member 8 and knee-portion 1a, at which rim portion 2 and sidewall 9 of the body portion of the capsule 10 are joined. Distance d is preferably between 1 and 3 mm. The average thickness (t) of each lip is preferably between 0.2 and 1.0 mm.

Thereby, the sealing area A at which the sealing lips 8a are arranged is of width b which preferably lies between 1 and 4 mm. Preferably, width b is chosen to be broader than the matching sealing surface 23a (see FIG. 2) of a beverage production device.

Accordingly, at least an outer and/or inner circular portion of the sealing member 8 respectively at least an outer and/or inner sealing lip 8a is not compressed and/or biased by a matching sealing surface of the beverage production device when enclosing the capsule.

The sealing lips 8a are preferably arranged at a distance d2 to each other. As shown in FIG. 1b, distance d2 is preferably constant for each of the neighboring sealing lips 8a. However, distance d2 between two neighboring sealing lips may as well vary in order to influence the sealing characteristics. Accordingly, different volumes of gas respectively air is enclosed between each of the sealing lips 8a during the enclosure of the capsule 10 by means of the beverage production device and hence, the sealing characteristics of the capsule 10 can be further adjusted. Preferably, distance d2 lies within the range of 0.5 to 2 mm.

The sealing lips 8a protrude to a predefined extent respectively height h1 from upper surface 2a of the rim portion 2 of the capsule. Thereby, height h1 is preferably constant for each of the protruding sealing lips 8a. However, the sealing lips 8a may be arranged to protrude to different extents respectively heights h1 from the rim portion 2. Thereby, height h1 preferably lies within the range of 0.8 to 2 mm.

As outlined above, the lips 8a can be arranged in various forms with respect to each other and with respect to the rim portion 2 in order to provide a relief-shaped sealing member of particular form. Accordingly, the sealing member can be specifically adapted to compensate for different kinds of irregularities formed in an enclosing member of a dedicated beverage production device.

In a preferred embodiment, at least 2 to 8 sealing lips 8a are provided in order to form the sealing member 8 of the capsule 10.

Figure 2:
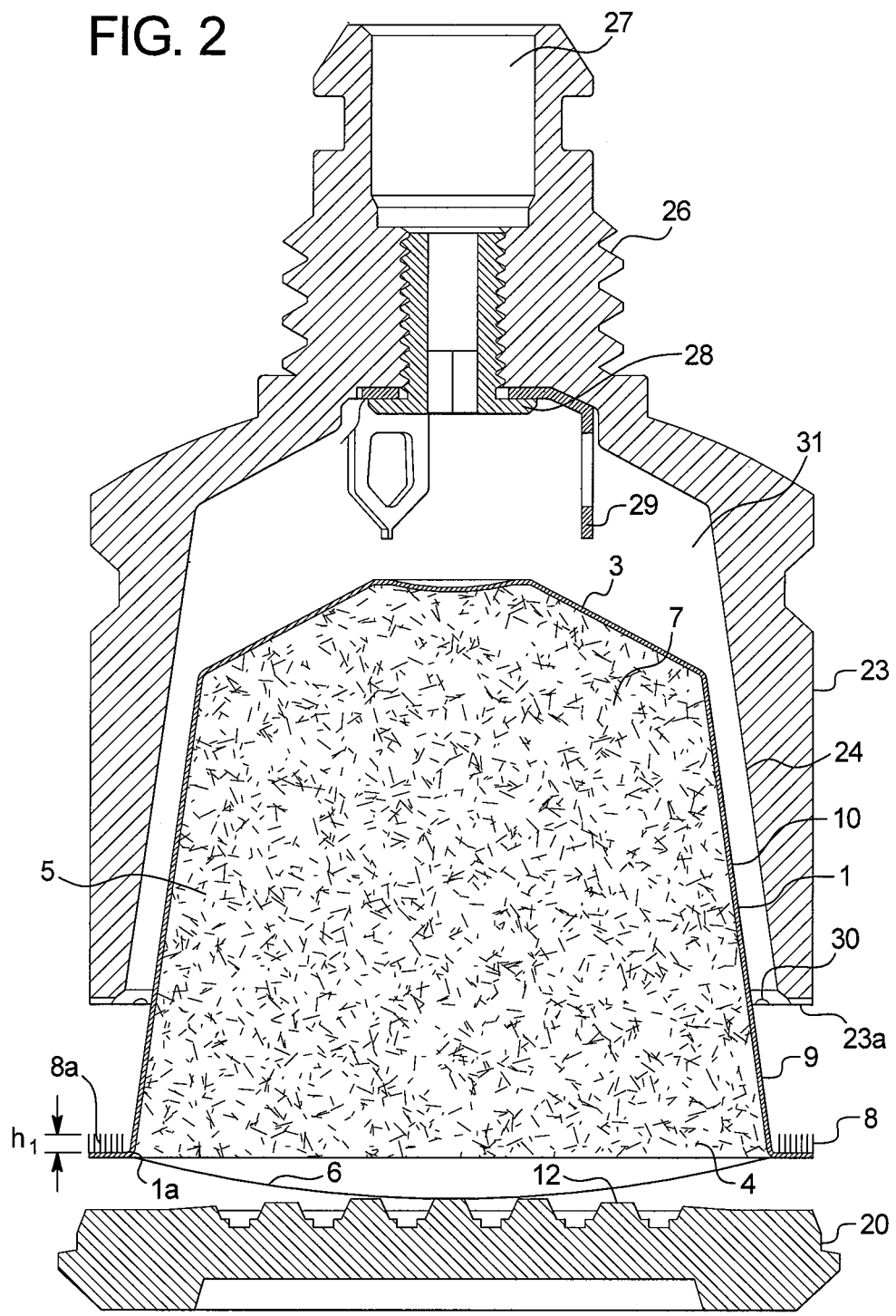
FIG. 2 shows a capsule according to the present invention placed into a dedicated enclosing member of a beverage production device.

FIG. 2 shows capsule 10 being placed into a dedicated enclosing member of a beverage production device. Thereby, the membrane 6 of capsule 10 is placed on a capsule holder 20 of the beverage production device having relief elements 12 which are designed to tear and perforate foil member 6 closing off the cup-like body portion 1 of the capsule 10. This tearing of the foil member can e.g. occur as soon as the pressure inside the capsule exceeds a threshold value. Note that the relief elements can have any protruding shape able to cause a (partial) tearing of the foil member. As an example only pyramids, needles, bumps, cylinders, elongated ribs are cited.

Note that the foil member 6 as shown is not exactly flat due to a defined over pressure inside the capsule, which over pressure is generated by introducing e.g. a protective gas when producing the filled capsule.

Within the capsule 10 ingredients 7 are contained, wherein the ingredients 7 are selected such that a beverage can be produced when having a liquid entering the capsule in the region of the top wall respectively the inlet face 3 of the capsule 10 and then interact which such ingredients 7. Preferred ingredients are e.g. ground coffee, tea or any other ingredients from which a beverage or other liquid or viscous comestible (e.g. soup) can be produced.

The body portion 1 of the capsule 10 is already partly surrounded by the circumferential wall 24 of an enclosing member 23 of the beverage preparation device. The shown enclosing member 23 has the shape of a bell. However, other shapes are viable, wherein the design of the interior contours (recess) of the enclosing member 23 is generally adapted to substantially match the contours of the capsule 10.

The enclosing member 23 may comprise an external thread 26 for mounting the enclosing member in a beverage preparation device and a water inlet opening 27 for feeding a liquid such as for example hot water under pressure to a water injector 28 which is releasable mounted, e.g., screwed, to the enclosing member 23.

It should be noted that the shown thread 26 is just an example for connection means and therefore, any other releasable or permanent connection means may be used to connect the enclosing member 23 to a beverage production device.

The other components of the beverage production device, such as e.g. the mechanism for displacing the enclosing member 23 and eventually also the capsule holder 20 are known from the prior art in the field of capsule-based espresso machines.

Moreover, the water injector 28 preferably comprises opening means 29 for opening a face of the capsule 10. Such opening means 29 may for example be a perforation element such as a blade, pin, etc. designed to produce an opening in inlet face 3 of the capsule 10 when the capsule holder 20 and the enclosing member 23 are moved close together e.g. by a manually operated or a automatic mechanism. According to this, a liquid such as water can be fed to the interior of the capsule 10 once the perforation element 29 protrudes into the interior of the capsule 10.

As depicted in FIG. 2, the enclosing member 23 and in particular the front surface respectively the matching surface 23a which is designed to press against the capsule holder 20 in order to enable an enclosing of the capsule 10 within the brewing chamber 31 may comprise irregularities such as for example radially oriented grooves 30. Said irregularities 30 may be present at the whole circumference as indicated in FIG. 2 or only at partial regions thereof. For instance, a plurality of radial grooves (forming potential air and/or liquid passages when not compensated by the sealing member) at the matching surface 23a, are distributed along the circumference at regular intervals. The irregularities may be present due to wear and tear during the lifecycle of the beverage preparation device.

Moreover, such irregularities may constitute release means for releasing the capsule 10 after the injection of liquid thereto. Said release means 30 prevent a 'vacuum effect' when the capsule 10 is to be released after it has been enclosed by the enclosing member 23 and the capsule holder 20. The material of the enclosing member is also preferably chosen to reduce its friction and/or adherence with the capsule. Accordingly, when the capsule holder 20 is opened, the risk that the capsule 10, instead of falling down, remains sucked into the enclosing member 23 due to a 'vacuum effect' can be avoided. Preferably, said release means 30 are apertures or recessed provided at the circumference of the lower edge 23a of the enclosing member 23 such that air can get into the space between the inlet face 3 and the side wall portions 14 of the capsule 10 and the inner wall 23b of the enclosing member 23, respectively.

As can be seen in detail in FIG. 2, the enclosing member 23 according to this embodiment does not comprise any dedicated resilient sealing member. However, the enclosing member 23 optionally can also comprise a resilient sealing member which may be arranged at the matching sealing surface 23a.

FIG. 3 relates to the interaction of the sealing member 8 and the enclosing member 23 of a beverage production device. As can be seen in the figure, the protruding lips 8a of the sealing member 8 which are provided in sealing area A of the rim portion 2 are compressible and/or bendable. Accordingly, when the enclosing member 23 and the capsule holder 20 are brought into a position to enclose the capsule 10, a lower edge 23a of the enclosing member 23 is pressed against the protruding lips 8a of the sealing member 8 which results in a compressing and/or bending of the individual sealing lips 8a. Thereby, the transition portion 23c of the lower edge 23a and the inner wall 24 of the enclosing member 23 is preferably chamfered as indicated in FIG. 3. However, the transition portion 23c may as well be round-shaped.

Due to the compressing force exerted by the enclosing member 23 the rim portion 8a is compressed from a first thickness h1 (see FIG. 2) to a second thickness h2. Thereby, thickness h1 of the uncompressed sealing member 8 is preferably comprised between 0.8 and 2.0 mm. In the compressed state, the thickness h2 of the sealing member 8 is preferably comprised between 0.05 and 1.0 mm.

As indicated in FIG. 3, sealing area A is preferably of a greater width b than the width of matching sealing surface 23a of the enclosing member 23. Thereby, distance d at which sealing area A is arranged form sidewall 9 of the capsule body portion is chosen such that at least one of the sealing lips 8a at the inner and/or outer portion of the sealing area A is not compressed by the enclosing member 23.

Accordingly, at least one inner sealing lip 8a' and/or an outer sealing lip 8a" are positioned to be not compressed by the enclosing member 23 during interaction with the capsule 10. Hence, at least one inner sealing lip 8a' is positioned upstream of the sealing engagement between the capsule 10 and the enclosing member 23 at sealing area A which strongly contributes to the sealing of the irregularities which may be present in the matching sealing surface of the enclosing member 23.

The height h1 of said inner and/or outer sealing lip(s) 8a',8a" may be greater than the height of the rest of the sealing lips which are designed to be compressed and/or bent by the matching sealing surface 23a.

If water is injected to the capsule 1 by means of the injector 28 (see FIG. 4), pressurized liquid may be present between an inner wall 24 of the enclosing member 23 and the side wall 9 of the capsule 10 as indicated by arrow P1. Due to the interaction of the lower edge 23a with the sealing member 8 provided to the capsule 10, said pressurized liquid is however prevented from by-passing the capsule 10.

As indicated by arrow P2 in FIG. 3, the pressure between the inner wall 24 and the side wall 9 of the capsule exerts a force onto the inner sealing lip(s) 8a' of the sealing member 8 positioned upstream of the sealing engagement between the compressed and/or bent sealing lips 8a and the lower edge 23a of the enclosing member 23. Accordingly, inner sealing lip(s) 8a' is deformed against the inner wall 24 of the enclosing member 23, thereby sealing the space between the enclosing member 23 and the rim portion 2 of the capsule 10. Moreover, sealing of the irregularities 30 provided at the lower edge 23a of the enclosing member 23 is obtained as the inner lip(s) 8a' fully cover the irregularities 30 of the enclosing member 23 as shown in the sectional side view according to FIG. 4.

Thereby, h1 of the inner sealing lip(s) 8a' is defined such that sealing lip(s) 8a' fully overlap(s) existing irregularities 30 in a matching sealing surface 23a of an enclosing member. It should be understood that h1' is preferably equal to height h1 of the rest of the sealing lips 8a of the sealing member. However, h1' of inner lips 8a' may as well be chosen to be greater than height h1.

As the flexible lips 8a are arranged concentrically to each other, a multitude of protrusions and recessions is provided which enables the sealing of the capsule 10 during beverage preparation with a dedicated beverage production device according to a labyrinth-sealing engagement. Thereby, each of the sealing lips 8a is pressed against the matching sealing surface 23a and thus, creates a pressure drop as liquid is not enabled to fully pass through the respective lip sealing between the matching sealing surface 23a and the rim portion 2 of the capsule. Hence, any liquid still passing through the respective lip sealing is forced to meander to flow to the following lip sealing engagement and thus, the liquid flow is essentially slowed down. Moreover, due to the accumulation of the pressure drops across the lip sealing engagements of the respective lips 8a, an effective fluid-tight seal between the enclosing member 23 and the capsule 10 is obtained.

During the shown closing pressure engagement of the enclosing member 23, the cup holder 20 and the capsule 10, water entering the interior of the capsule 10 by means of an opened inlet face 3 builds up pressure inside the capsule. Accordingly, water entering the capsule is able to interact with the provided beverage ingredients 7 in order to form a liquid comestible. Due to the pressure built up within the capsule 10, the relief members 12 (see FIG. 2) of the capsule holder 20 produce openings in the membrane 6 of the capsule. Hence, the beverage produced from the ingredients 7 contained in the capsule can be drained in small interstices between the relief members 12 and the surrounding foil member 6. Thereby, due to the sealing member 8 liquid provided to the capsule 10 can only flow through the capsule 10, but not at the exterior of the capsule. Accordingly, effective sealing of the capsule is enabled.

Although the present invention has been described with reference to preferred embodiments thereof, many modifications and alternations may be made by a person having ordinary skill in the art without departing from the scope of this invention which is defined by the appended claims.

For example, the invention is explained referring to a certain design of a capsule, i.e. a design according to which the capsule comprises a cylindrical or frustoconical body portion. However, it is to be understood that other designs of the capsule are viable. Generally a capsule according to the present invention comprises at least two opposing wall members which are connected to each other at the edges to form a sealed flange-like rim area, thus enclosing a defined compartment in the interior of the capsule.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A capsule for containing beverage ingredients, the capsule being designed for insertion in a beverage production device, the capsule comprising:
   a cup-like body portion,
   a flange-like rim portion positioned at one end of the capsule,
   a delivery wall, and
   a sealing member made from plastic, designed for compensating for eventual irregularities in a matching sealing surface of a beverage production device cooperating with the sealing member of the capsule, and comprising at least two lips distanced from one another in a radial direction, each having a first height and a width such that the first height is at least 1.5 times larger than the width, each protruding from and integrally formed with the flange-like rim portion of the capsule, each extending from the flange-like rim portion in a direction toward an opposite end of the capsule, and at least one of the lips is designed to be compressed from the first height to a second height.

2. A capsule according to claim 1, wherein the at least two lips extend from a relatively flat portion of the flange-like rim portion, and the relatively flat portion faces the opposite end of the capsule.

3. A capsule according to claim 1, wherein the sealing member is positioned with a clearance distance of 1 to 3 mm between the innermost lip and the capsule body.

4. The capsule according to claim 1, wherein at least one of the lips has a different height relative to another one of the lips.

5. A capsule for containing beverage ingredients, the capsule being designed for insertion in a beverage production device, the capsule comprising:
   a cup-like body portion,
   a flange-like rim portion positioned at one end of the capsule,
   a delivery wall, and
   a sealing member made from plastic, designed for compensating for eventual irregularities in a matching sealing surface of a beverage production device cooperating with the sealing member of the capsule, and comprising at least two lips distanced from one another in a radial direction, each having a first height and a width such that the first height is at least 1.5 times larger than the width, each protruding from and integrally formed with the flange-like rim portion of the capsule, each extending from the flange-like rim portion in a direction toward an opposite end of the capsule, and at least one of the lips is designed to be compressed from the first height to a second height,
   wherein the lips comprise a first lip, a second lip and a third lip that are concentric, the first and third lips have a greater height than the second lip, the second lip is positioned between the first and third lips in the radial direction, the first and third lips are positioned to not be compressed by a matching sealing surface of a beverage production device, and the second lip is designed to be compressed from the first height to the second height.

6. The capsule according to claim 1, wherein each of the lips are connected to the flange-like rim portion at one end of the lip and are free lips not engaged by another component of the capsule.

7. The capsule according to claim 1, wherein the second height is between 0.5 and 1 mm.

8. The capsule according to claim 1, wherein the lips protrude from the flange-like rim portion of the capsule parallel to a centre axis of the capsule body portion to the first height.

9. The capsule according to claim 1, wherein the first height is between 0.8 and 2 mm.

10. The capsule according to claim 9, wherein an average thickness of each lip is between 0.2 and 1.0 mm.

11. The capsule according to claim 1, wherein the lips are arranged at a distance with respect to each other that is between 0.5 and 2 mm.

12. The capsule according to claim 1, wherein at least an outer or inner circular portion of the sealing member is designed to not be compressed by a matching sealing surface of a beverage production device.

13. The capsule according to claim 12, wherein at least one of the lips is positioned in the outer or inner circular portion of the sealing member.

14. The capsule according to claim 12, wherein at least one of the lips is designed to be positioned upstream of a sealing engagement between the capsule and a matching sealing surface of an enclosing member of a beverage production device.

15. A beverage production system, comprising a capsule for containing beverage ingredients, the capsule being designed for insertion in a beverage production device, wherein:

the capsule comprises a cup-like body portion, a flange-like rim portion positioned at one end of the capsule, a delivery wall and a sealing member made from plastic and comprising at least two lips distanced from one another in a radial direction, each having a first height and a width such that the height is at least 1.5 times larger than the width, each protruding from and integrally formed with the flange-like rim portion of the capsule, each extending from the flange-like rim portion in a direction toward an opposite end of the capsule, and at least one of the lips is designed to be compressed from a first height to a second height; and a beverage production device designed for receiving the capsule in a brewing chamber, the brewing chamber is defined, at least partially, by a capsule enclosing member having a front surface with irregularities, the front face of the enclosing member cooperating with the sealing member of the capsule, and the sealing member of the capsule is designed for compensating for the irregularities in the front surface of the capsule enclosing member.

16. The beverage production system according to claim 15, wherein the irregularities in a matching sealing surface of a beverage production device are radially arranged grooves.

17. The capsule according to claim 1, wherein at least one of the lips is positioned to not be compressed by the enclosing member during interaction of the enclosing member with the capsule.

18. The capsule according to claim 1, wherein at least one of the lips is positioned to not be compressed and has a height that is greater than the height of the lips which are designed to be compressed.

19. The beverage production system according to claim 15, wherein the lips comprise a first lip, a second lip and a third lip that are concentric, the first and third lips have a greater height than the second lip, the second lip is positioned between the first and third lips in the radial direction, the first and third lips are positioned to not be compressed by a matching sealing surface of a beverage production device, and the second lip is designed to be compressed from the first height to the second height.

* * * * *